United States Patent
Garrett

(12) United States Patent (10) Patent No.: US 6,324,802 B1
(45) Date of Patent: Dec. 4, 2001

(54) SWIMMING POOL INTERIOR FINISH

(76) Inventor: Gregory C. Garrett, 2106 W. El Alba Way, Chandler, AZ (US) 85224

( * ) Notice: Subject to any disclaimer, the term of this patent is extended or adjusted under 35 U.S.C. 154(b) by 0 days.

(21) Appl. No.: 09/494,418

(22) Filed: Jan. 31, 2000

(51) Int. Cl.[7] .................................................. B65B 7/28
(52) U.S. Cl. ................ 52/309.12; 52/169.7; 106/708; 106/705; 106/14.05; 4/492
(58) Field of Search ................ 52/169.7; 4/492; 106/727, 737, 738, 819

(56) References Cited

U.S. PATENT DOCUMENTS

| | | | |
|---|---|---|---|
| 4,106,246 | * 8/1978 | LaFountaine | 52/169.7 |
| 4,261,347 | * 4/1981 | Spencer, III et al. | 128/66 |
| 5,556,458 | * 9/1996 | Brook et al. | 106/708 |
| 5,588,990 | 12/1996 | Dongell | 106/716 |
| 5,650,004 | 7/1997 | Yon | 106/719 |
| 5,714,003 | * 2/1998 | Styron | 106/705 |
| 5,933,883 | * 8/1999 | Biancamano | 4/492 |
| 5,985,011 | * 11/1999 | Foltz et al. | 106/14.05 |

OTHER PUBLICATIONS

Fly Ash, Silica Fume, Slag and Natural Pozzolans in Concrete: Proceedings—Fourth International Conference, Istanbul, Turkey, May 1992—"Effect of Mineral Admixtures on the Cement Paste Interface", Article SP 132–136, pp. 656–669.

* cited by examiner

*Primary Examiner*—Carl D. Friedman
*Assistant Examiner*—Steve Vainer
(74) *Attorney, Agent, or Firm*—Antonio R. Durando; Durando Birdwell & Janke, P.L.C.

(57) ABSTRACT

A composition designed to produce cementitious interior finishes for swimming pools, spas and fountains includes one or more aggregates, and cement for binding the aggregates. The composition further includes silica fume and a set retarder and may also include a dispersing agent as well as an inhibitor for alkali-silica reactivity.

57 Claims, 4 Drawing Sheets

SWIMMING POOL INTERIOR FINISH

BACKGROUND OF THE INVENTION

1. Field of the Invention

The invention relates to an interior finish for a basin designed to come into contact with an aqueous medium.

2. Description of the Prior Art

The principal interior finishes in the swimming pool industry and related industries are pool plaster or marcite. Plaster and marcite are normally composed of white cement, aggregates such as crushed marble and limestone, and white silica sand. The ratio of white cement to aggregates is generally 1 part cement to 1-½ or 2 parts aggregates. The plaster or marcite, which may further include a set accelerator (calcium chloride) and a pumping aid (bentonite), is mixed with water and applied to the interior of a swimming pool, spa or other water basin by hand or with a pump.

Although plaster and marcite have been in use for over 40 years, certain shortcomings have caused their popularity to decline. Thus, plaster and marcite tend to stain, etch, scale and show other forms of mineral precipitation. Etching of plaster and marcite may result in the appearance of generally rounded spots having a size of about ⅛ to ¾ inch. These spots occur in the surface layer usually referred to as the "creme" or laitance layer. The spots are porous, and hence permeable, and are due to the selective dissolution of calcium compounds from the surface layer.

The incidence of spot etching has been increasing, and the increase is often attributed to the increased use of acidic swimming pool and spa sanitizers such as trichloro-s-triazinenrine and bromochlorodimethylhydantoin. These sanitizers have grown in popularity because they are long-lasting and easy to use.

The growing popularity of acidic sanitizers has been accompanied by a trend towards softer water. This is water from which minerals and divalent metallic compounds have been removed to improve palatability. However, by decreasing the concentrations of these components, and particularly the concentrations of calcium bicarbonate, calcium carbonate and other calcium salts, the carbon dioxide-bicarbonate equilibrium is shifted such that the dissolution of calcium compounds increases.

Air pollution also has a deleterious effect on plaster and marcite. Thus, certain pollutants in the air react to form acid rain which, in turn, causes the water in pools, spas and other water basins to become more aggressive.

The above phenomena are mostly limited to the surfaces of plaster and marcite finishes. Beginning in the mid to late 1980s, the swimming pool industry began experimenting with exposed aggregate surfaces. This type of surface is produced by mixing cement and water with small rounded pebbles or other small aggregates and applying the mixture to the interior of a pool, spa or other water basin. After troweling the mixture in traditional fashion, the surface creme or laitance layer is removed by misting or washing and is subsequently pumped out of the pool as a slurry. The slurry is fed into a containment vessel or holding tank and subsequently transported from the job site.

An exposed aggregate surface has an appearance similar to exposed concrete except that thousands of pebbles or other aggregates (both natural and synthetic) project outward. Such a surface, while rougher than conventional plaster or marcite, has major advantages over plaster and marcite. To begin with, the absence of a surface creme and the presence of thousands of projecting pebbles, beads or other aggregates make the damage from aggressive water less visible. Furthermore, the irregular appearance of an aggregate surface also hides many types of surface stains as well as the normal mottling or shade variations which occur in traditional plaster and marcite.

To give the consumer a choice of colors, differently colored pebbles or other aggregates, as well as colored pigments, are used in exposed aggregate surfaces. The pigments, which are mostly mineral pigments in the form of inorganic metal oxides, have a greater effect than the aggregates and provide the most attractive finishes.

For proper coloration, a pigment must be uniformly dispersed in the mixture to be used for an exposed aggregate surface. The mixtures for exposed aggregate surfaces are generally produced at the job site and, due to the manner in which pigments are added, color inconsistencies often arise. Moreover, pigmented surfaces of darker coloration tend to exhibit "fading" over time. This is usually the result of carbonation of the exposed cement binder around the pebbles, beads or other aggregates.

Another problem with pigmented surfaces occurs when a small field repair must be performed. Even when given the initial formulation, it is extremely difficult for field technicians to properly match repaired areas and original areas.

A further shortcoming of exposed aggregate surfaces is the effect they produce at the water line. Traditional pool plaster and marcite must be continuously submerged during curing because plaster or marcite cured in air ultimately undergoes a volume change which can result in cracking and possible eventual delamination. To allow complete submersion of the plaster or marcite while curing, ceramic tile is placed around the perimeter of the pool, spa or other water basin at the water line. Once the plaster or marcite has been applied, the pool, spa or other water basin is filled with water to the level of the tile so that the plaster or marcite is fully submerged for curing.

With exposed aggregate surfaces, the tile can be eliminated since the volume change during hydration in the air is reduced thereby decreasing the likelihood of cracking and delamination from the concrete or shotcrete substrate.

Severe mineral buildups develop at the water line with plaster and marcite as well as with exposed aggregate surfaces. In a pool, spa or other water basin lined with plaster or marcite, these buildups form on the ceramic tile and can be removed fairly easily by different methods. However, with an exposed aggregate surface, the mineral buildups develop on the aggregate surface and are extremely difficult to remove. This is partly attributable to the nature of the interfacial transition zone, that is, the interface between the bulk cement binder and the aggregates. This specialized zone is composed of duplex layers of calcium hydroxide and calcium silicate hydrate which, upon reacting with minerals in the water, produce particularly tenacious buildups of calcium salts and other salts.

U.S. Pat. Nos. 5,650,004 and 5,588,990 disclose cement compositions containing one or more pozzolans. Among other things, these compositions are intended to increase resistance to attack by aggressive water. In these compositions, the pozzolan or pozzolans generally have a particle size of 7 micrometers or more.

It is known that the interfacial transition zone between the bulk cement binder and the aggregates is approximately 50 micrometers thick. See, for instance, Fly Ash, Silica Fume, Slag and Natural Pozzolans in Concrete: Proceedings—Fourth International Conference, Istanbul, Turkey, May 1992—"Effect of Mineral Admixtures on the Cement Paste Interface", Article SP 132–136, pp. 656–669. This publication further discloses that the interfacial transition zone is a weak link in cementitious materials and that the thickness of the zone can be decreased, while the density is increased, by the addition of finely divided pozzolans. The publication additionally discloses that finely divided pozzolans reduce the amount of soluble calcium hydroxide in the interfacial transition zone. Among the pozzolans studied in the publication are metakaolin having a mean grain size of 1.5 micrometers and silica fume having a mean grain size of 0.1 micrometer.

The use of silica fume to increase the resistance of cement to chemical deterioration is also taught by T. A. Durning et al. See "Using Microsilica to Increase Concrete Resistance to Aggressive Chemicals", Concrete Admixtures, American Concrete Institute Compilation 22nd, P.15.

In spite of the advances made to date, compositions for use in aqueous media are not entirely satisfactory. For instance, interior finishes made from such compositions tend to hydrate rapidly in hot weather which makes it difficult to trowel and wash the finishes. Moreover, significant numbers of shrinkage cracks still tend to develop in the finishes.

SUMMARY OF THE INVENTION

It is an object of the invention to simplify the application of an interior finish to a basin designed to come into contact with an aqueous medium.

Another object of the invention is to reduce cracking in an interior finish of a basin designed to contact an aqueous medium.

The preceding objects, as well as others which will become apparent as the description proceeds, are achieved by the invention.

One aspect of the invention resides in a product for making an interior finish of a basin designed to contact an aqueous medium. The product includes a composition which comprises at least one aggregate, at least one binder for the aggregate, and at least one set retarder. The product further comprises at least one pozzolan, and such pozzolan is silica fume. The product preferably also comprises a dispersing agent, and an inhibitor for the inhibition of alkali-silica reactivity.

The set retarder allows an interior finish to hydrate slowly and uniformly in hot weather so that there is ample time to trowel and wash the interior finish. This makes it easier to apply the interior finish to a basin. The set retarder also has the effect of reducing the occurrence of shrinkage cracks.

In a cementitious interior finish, the silica fume increases the resistance of the finish to attack by aggressive aqueous media. The silica fume accomplishes this in several ways. Thus, the silica fume causes relatively soluble calcium hydroxide to be converted to less soluble calcium silicate hydrate. Furthermore, the silica fume reduces the thickness of the weak interfacial transition zone between the cement binder and the aggregate or aggregates. The silica fume additionally acts to reduce carbonation and also serves to reduce the reactions associated with alkali-silica reactivity. These reactions can lead to cracks and expansive gel formation.

Another aspect of the invention resides in a basin designed to contact an aqueous medium. The basin has an interior finish comprising at least one aggregate, at least one binder for the aggregate, and at least one set retarder. The finish further comprises at least one pozzolan constituted by silica fume. The finish preferably also comprises a dispersing agent and an inhibitor for the inhibition of alkali-silica reactivity.

An additional aspect of the invention resides in a method of making a basin designed to contact an aqueous medium. The method comprises the steps of forming a cavity, and lining at least a portion of the cavity with an interior finish. The finish includes at least one aggregate, at least one binder for the aggregate, at least one set retarder, and at least one pozzolan with the pozzolan being silica fume. As before, the finish preferably also comprises a dispersing agent and an inhibitor for the inhibition of alkali-silica reactivity.

Other features and advantages of the invention will be forthcoming from the following detailed description of preferred embodiments when read in conjunction with the accompanying drawings.

DESCRIPTION OF THE PREFERRED EMBODIMENTS

Figure 1:
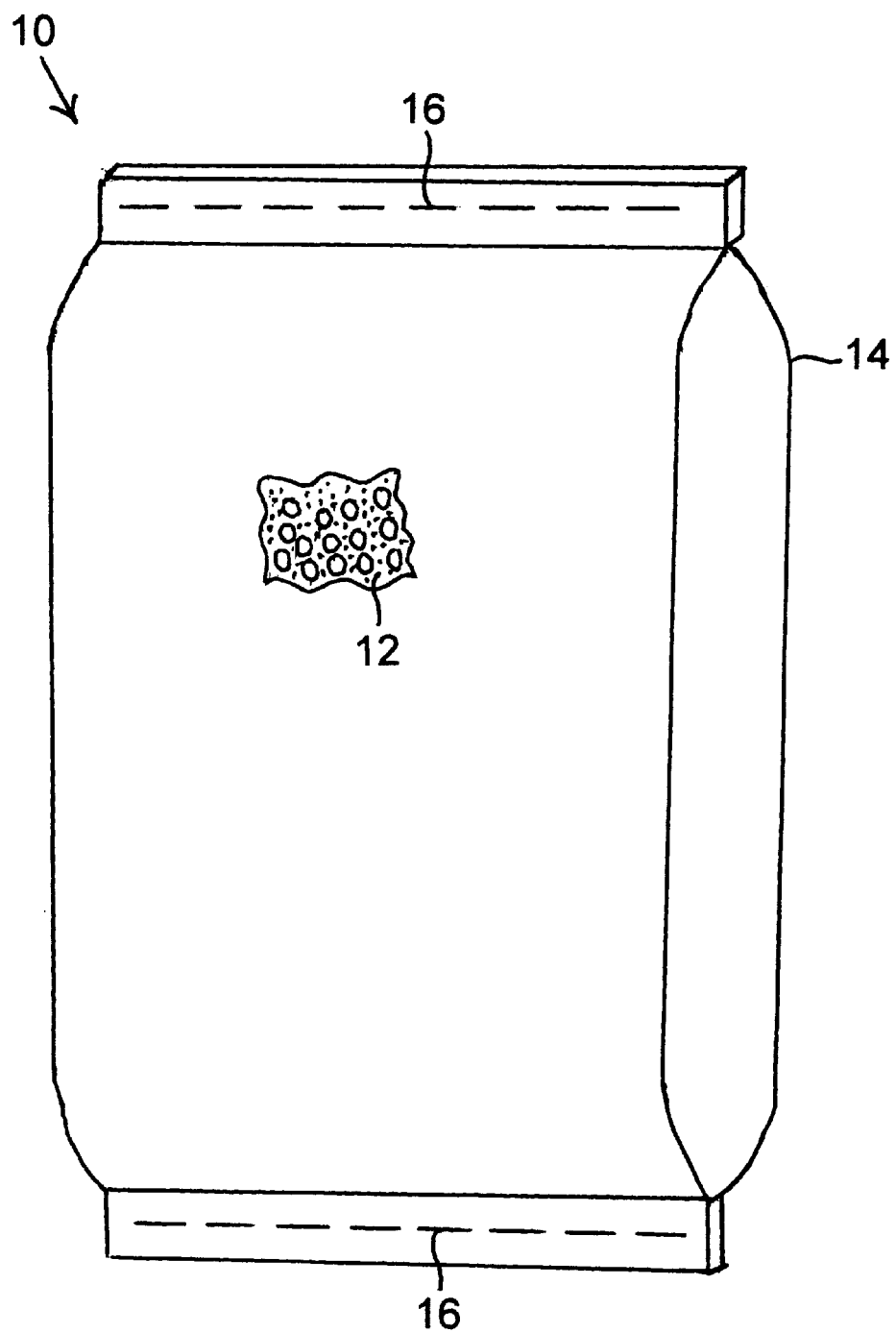
FIG. 1 is a perspective, partly broken away view of a bag containing a composition according to the invention.

One aspect of the invention resides in a composition or blend which can be used to produce an interior finish for basins designed to contact an aqueous medium. Examples of such basins are swimming pools, spas and fountain basins. The composition is advantageously formulated to yield an interior finish in the form of an exposed aggregate surface.

The composition includes one or more aggregates. A preferred aggregate is pebble although other aggregates can be employed. Among the other aggregates which can be employed are synthetic ceramic particles, spherical plastic beads, spherical glass beads, tumbled glass particles, crushed calcite, crushed rock, silica sand and calcite sand. Synthetic ceramic particles and crushed calcite can also serve as coloring agents.

The composition further includes at least one binder for the aggregate or aggregates, and the binder or binders will most commonly be cement. The composition will thus usually be a cementitious composition and will produce a cementitious interior finish. Various types of cement can be used including Federal White Cement, TXI Adobe Buff Cement, Cruz Azul White Cement and Lehigh White Cement. on a weight basis, the ratio of aggregate to binder will typically be between 1 and 2 parts aggregate to 1 part binder.

The composition additionally includes one or more pozzolans. If only a single pozzolan is present, this pozzolan will be silica fume. Should the composition contain two or more pozzolans, silica fume will constitute one of them. By way of example, a pozzolan which may be used in conjunction with silica fume is metakaolin. In a cementitious composition, the total pozzolan content of the composition is preferably between 7 and 10 percent by weight of the cementitious material in the composition.

The composition also includes at least one set retarder, i.e., at least one ingredient which delays setting or hardening of an interior finish produced from the composition. The set retarder will typically be an inorganic salt with borate salts being preferred. It is particularly advantageous for the set retarder to be a polyborate salt such as sodium tetraborate pentahydrate or lithium tetraborate. Only small amounts of the set retarder are required, e.g., of the order of 0.075 percent by weight of the composition.

The composition may further include at least one dispersing agent or dispersant. The dispersing agent is advantageously a superplasticizer or high range water reducer and should be in a dry or particulate form. A melamine may be employed as a dispersing agent, and a suitable melamine is marketed by SKW Chemicals, Inc. of Marietta, Ga. under the name Melment (Registered Trademark) F10. In a cementitious composition, the dispersing agent preferably constitutes between 0.2 and 1.5 percent by weight of the cementitious material in the composition.

The composition can also include at least one primary or additional inhibitor or inhibiting agent for the inhibition of alkali-silica reactivity. The term "primary" or "additional" is used for this inhibitor because the silica fume also causes some reduction in alkali-silica reactivity. The primary inhibitor may be a lithium compound with lithium hydroxide and lithium nitrate being preferred. A product for controlling alkali-silica reactivity is marketed under the name Lifetime (Trademark) SL by FMC Corporation's Lithium Division of Gastonia, N.C. The primary alkali-silica reactivity inhibitor is preferably present in an amount between 0.2 and 1.0 times the sodium equivalent of the composition expressed in weight. The sodium equivalent can be determined using the following equation:

$$\text{Sodium Equivalent} = \%Na_2O + 0.658 \times \%K_2O.$$

The various ingredients or components of the composition may be mixed together or blended in a conventional fashion to produce a substantially uniform mixture. It is of advantage for the ingredients to be dry during mixing or blending, especially if the composition includes a dispersing agent. The composition can be marketed as a premix, and specified amounts of the composition may be packaged in suitable containers for sale, e.g., in buckets or bags. By making the composition as a premix, it becomes a simple matter to match an existing interior finish if more of the finish must be made.

In FIG. 1, the numeral 10 identifies a product in accordance with the invention. The product 10 includes a mass 12 of the composition of the invention and a container 14 for the mass 12. The container 14 is here a bag which is closed at opposite ends thereof by stitching 16. The bag 14 is similar to the bags commonly used for rock salt, charcoal and the like.

To produce a basin having an interior finish made from a composition according to the invention, a cavity is formed. If the basin is to be in-ground, this can involve digging a hole and then lining the hole with a base layer, e.g., a layer of shotcrete or gunite. On the other hand, if the basin is to be aboveground, the cavity may be formed by making a shell which defines the cavity. A composition in accordance with the invention is subsequently mixed with water in a conventional manner to form a flowable and hardenable mass. A layer of the flowable mass is applied to the base layer, or to the interior of the shell, by a pump or by hand and is thereupon misted or washed and troweled. The mass sets or hardens to form an interior finish which lines the cavity within the hole or shell.

Figure 2:
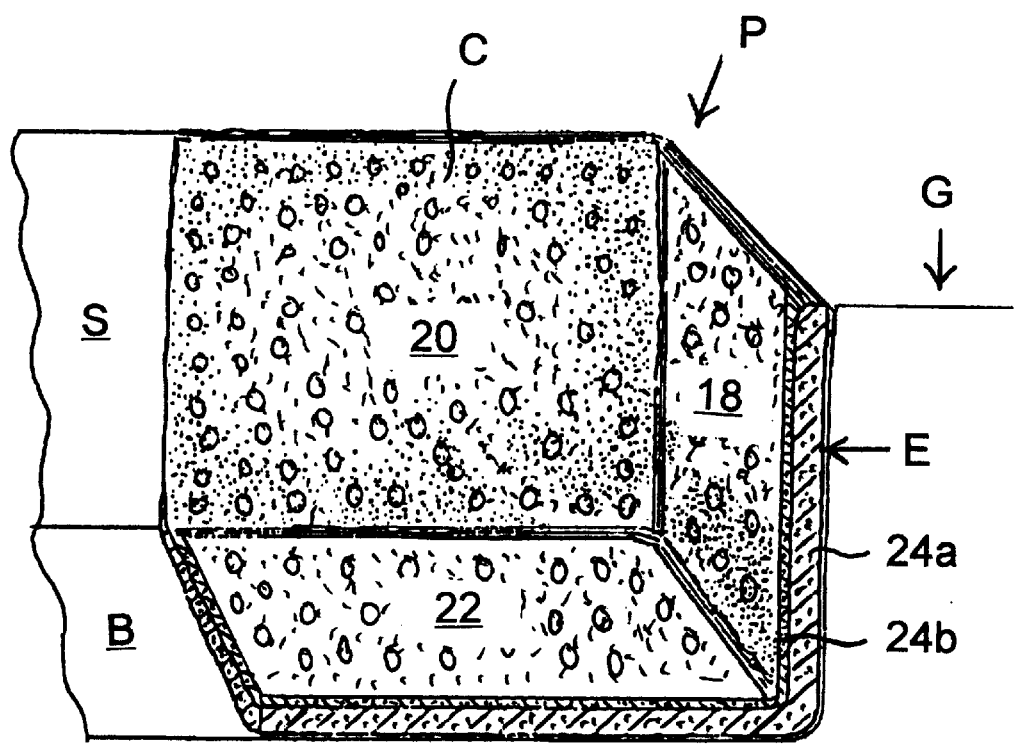
FIG. 2 is a fragmentary perspective sectional view of a swimming pool having an interior finish made from a composition in accordance with the invention.

FIG. 2 illustrates a basin in the form of an in-ground swimming pool P. The pool P is set in a hole which has been excavated in the ground, and ground level is indicated by G. An end wall E, a side wall S and a bottom wall B of the hole are visible, and the pool P has an end wall 18 which covers the hole end wall E, a side wall 20 which covers the hole side wall S, and a bottom wall 22 which covers the hole bottom wall B. Each of the pool walls 18,20,22 is made up of an outer layer or base 24$a$ and an inner layer or facing 24$b$. The outer layers 24$a$ may be conventional while the inner layers 24$b$ are made from a composition in accordance with the invention. By way of example, the outer layers 24$a$ can be composed of shotcrete or gunite. The inner layers 24$b$ constitute part of an interior finish for the pool P, and the interior finish lines a cavity C formed in the hole which accommodates the pool P.

Figure 3:
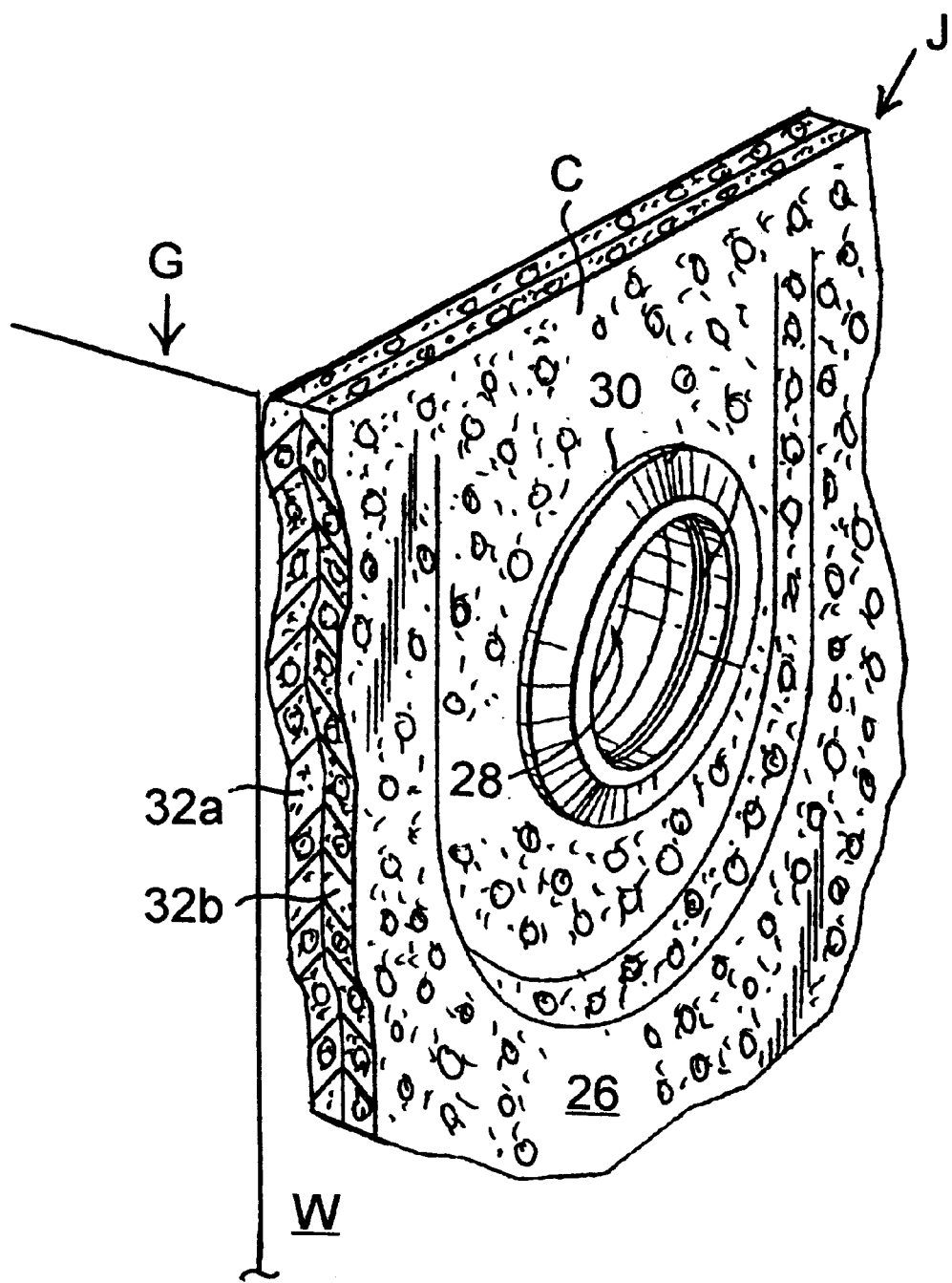
FIG. 3 is a fragmentary perspective sectional view of a spa having an interior finish made from a composition according to the invention.

FIG. 3 shows a basin in the form of an in-ground spa J. The spa J is sunk in a hole which has been dug in the ground, and ground level is once again denoted by G. A wall W of the hole can be seen, and the spa J has a wall 26 which overlies the hole wall W. The spa wall 26 is provided with an opening 28, and the opening 28 is fitted with a grommet 30 adapted to receive a non-illustrated jet. The wall 26 of the spa J includes an outer layer or base 32$a$ and an inner layer or facing 32$b$. The outer layer 32$a$ can be conventional whereas the inner layer 32$b$ is produced from a composition according to the invention. The inner layer 32$b$ forms part of an interior finish for the spa J, and the interior finish lines a cavity C within the hole which contains the spa J.

Figure 4:
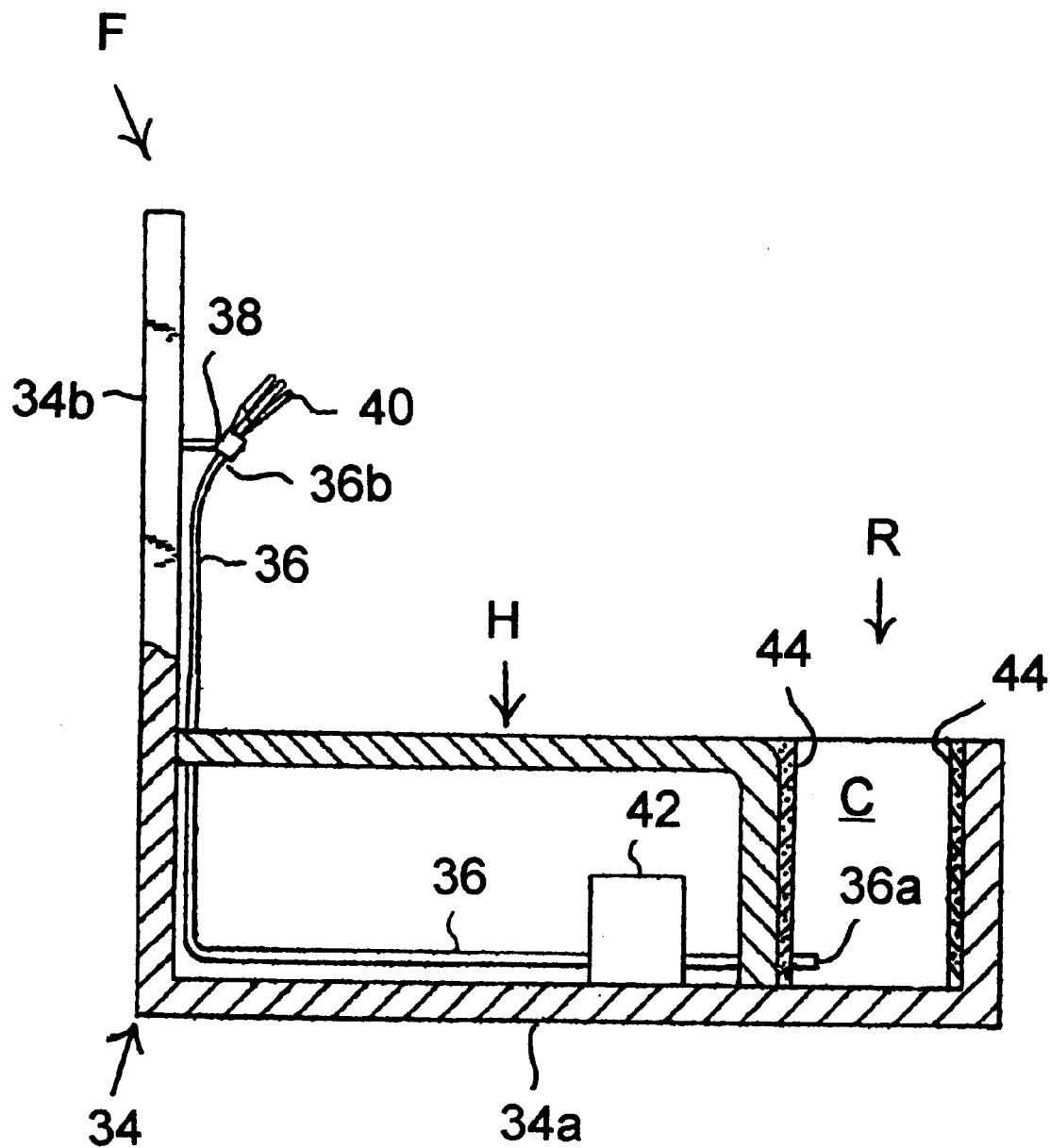
FIG. 4 is a sectional side view of a fountain having an interior finish made from a composition in accordance with the invention.

FIG. 4 illustrates a basin R which constitutes part of an aboveground fountain F and is adapted to hold a body of water. The fountain F comprises a shell or support structure 34 having a hollow base 34$a$ which defines the basin R and an extension 34$b$ extending upward from the base 34$a$. The shell 34 may be constructed in a conventional manner. A housing H is located in the basin R. and a water recirculating pipe 36 runs through the housing H. The pipe 36 has a horizontal section with an intake end 36$a$ which projects into the basin R. The pipe 36 further has a vertical section which extends out of the housing H to a location above the latter. The vertical section, which is located adjacent the extension 34$b$ of the shell 34 and is stabilized by a bracket 38 mounted on the extension 34$b$, includes a discharge end 36$b$ equipped with an array of nozzles 40. The nozzles 40 are arranged to shoot streams of water into the basin R. A recirculating pump 42 in the pipe 36 delivers water from the basin R to the nozzles 40.

Each surface of the base 34$a$ which faces the basin R, as well as each surface of the housing H which faces the basin R, is provided with a coating 44 made from a composition in accordance with the invention. The coatings 44 constitute an interior finish for the basin R, and the interior finish lines a cavity C inside the basin R.

The following are examples of compositions or blends according to the invention.

EXAMPLE 1

| | |
|---|---|
| 1000 lbs. | Imperial White Pebble |
| 940 lbs. | Federal White Cement |
| 66 lbs. | White Silica Fume |
| 1.5 lbs. | Sodium Tetraborate Pentahydrate |
| 3 lbs. | Sulfonated Melamine Polycondensate |
| 1.5 lbs. | Lithium Hydroxide |

This composition may be referred to as a White Pebble Blend.

EXAMPLE 2

| | |
|---|---|
| 800 lbs. | Gold Pebble |
| 200 lbs. | Black Pebble |
| 940 lbs. | Federal White Cement |
| 94 lbs. | Black Silica Fume |
| 1.5 lbs. | Sodium Tetraborate Pentahydrate |
| 3 lbs. | Sulfonated Melamine Polycondensate |
| 1.5 lbs. | Lithium Hydroxide |

This composition may be referred to as a Blue-Black Pebble Blend.

EXAMPLE 3

| | |
|---|---|
| 900 lbs. | Gold Pebble |
| 100 lbs. | Black Pebble |
| 930 lbs. | Federal White Cement |
| 30 lbs. | Gray Silica Fume |
| 50 lbs. | Black Silica Fume |
| 1.5 lbs. | Sodium Tetraborate Pentahydrate |
| 3 lbs. | Sulfonated Melamine Polycondensate |
| 1.5 lbs. | Lithium Hydroxide |

This composition may be referred to as a Blue-Gray Pebble Blend.

EXAMPLE 4

| | |
|---|---|
| 1000 lbs. | Black Pebble |
| 940 lbs. | Federal White Cement |
| 95 lbs. | Black Silica Fume |
| 2 lbs. | Sodium Tetraborate Pentahydrate |
| 3 lbs. | Sulfonated Melamine Polycondensate |
| 1.5 lbs. | Lithium Hydroxide |

This composition may be referred to as a Black Pebble Blend.

EXAMPLE 5

| | |
|---|---|
| 1000 lbs. | Gold Pebble |
| 235 lbs. | TXI Adobe Buff Cement |
| 705 lbs. | Federal White Cement |
| 66 lbs. | Gray Silica Fume |
| 1.5 lbs. | Sodium Tetraborate Pentahydrate |
| 3 lbs. | Sulfonated Melamine Polycondensate |
| 1.5 lbs. | Lithium Hydroxide |

This composition may be referred to as a Gold Pebble Blend.

EXAMPLE 6

| | |
|---|---|
| 600 lbs. | Gold Pebble |
| 400 lbs. | Black Pebble |
| 940 lbs. | Federal White Cement |
| 50 lbs. | White Silica Fume |
| 30 lbs. | Gray Silica Fume |
| 1.5 lbs. | Sodium Tetraborate Pentahydrate |
| 10 lbs. | Teal Synthetic Ceramic Particles |
| 3 lbs. | Sulfonated Melamine Polycondensate |
| 1.5 lbs. | Lithium Hydroxide |

This composition may be referred to as a Green Pebble Blend. The synthetic ceramic particles can, for instance, be constituted by Color #K5695-Teal.

EXAMPLE 7

| | |
|---|---|
| 900 lbs. | Gold Pebble |
| 100 lbs. | Black Pebble |
| 705 lbs. | Federal White Cement |
| 235 lbs. | Adobe Buff Cement |
| 66 lbs. | Gray Silica Fume |
| 8 lbs. | Red Pigment |
| 1.5 lbs. | Sodium Tetraborate Pentahydrate |
| 3 lbs. | Sulfonated Melamine Polycondensate |
| 1.5 lbs. | Lithium Hydroxide |

This composition may be referred to as a Red Pebble Blend. The red pigment can be an iron oxide pigment such as Bayferrox #110 Red pigment.

EXAMPLE 8

| | |
|---|---|
| 1000 lbs. | Blue-Black Pebble |
| 940 lbs. | Federal White Cement |
| 66 lbs. | Gray Silica Fume |
| 10 lbs. | Plum-colored Synthetic Ceramic Particles |
| 1.5 lbs. | Sodium Tetraborate Pentahydrate |
| 3 lbs. | Sulfonated Melamine Polycondensate |
| 1.5 lbs. | Lithium Hydroxide |

This composition may be referred to as a Plum Pebble Blend. The synthetic ceramic particles can, for instance, be constituted by Color #K5767 Plum.

EXAMPLE 9

| | |
|---|---|
| 1000 lbs. | Blue-Black Pebble |
| 940 lbs. | Federal White Cement |
| 66 lbs. | Gray Silica Fume |
| 8 lbs. | Plum-colored Pigment |
| 1.5 lbs. | Sodium Tetraborate Pentahydrate |
| 3 lbs. | Sulfonated Melamine Polycondensate |
| 1.5 lbs. | Lithium Hydroxide |

This composition may again be referred to as a Plum Pebble Blend. The plum-colored pigment can be an iron oxide pigment such as Bayferrox #180 Plum Pigment.

When mixed with water and allowed to set or harden, compositions such as those of the Examples yield concrete having superior characteristics.

As illustrated by the Examples, compositions according to the invention can have a variety of colors. A number of these colors can be derived from silica fume without the use of pigments or macrocolorants, and such colors include white, blue-black, blue-gray, black and salt-and-pepper. Other colors, including green, blue, plum and red, may require the addition of a pigment or macrocolorant. Compositions with adobe cement may have a gold color which is obtained from the fly ash in this type of cement.

Compositions in accordance with the invention have a number of advantages including the following:

1. The set retarder allows the number of shrinkage cracks in an interior finish to be reduced.
2. The set retarder makes it possible to achieve a controlled set of an interior finish, rather than a flash set, in hot weather. In other words, the set retarder enables the interior finish to hydrate slowly and uniformly. This provides ample opportunity to wash and trowel the interior finish.
3. The set retarder minimizes the loss of compressive strength of an interior finish.
4. In cementitious interior finishes, the silica fume promotes the conversion of calcium hydroxide to calcium silicate hydrate. This increases the resistance of an interior finish to deterioration because calcium silicate hydrate is less soluble than calcium hydroxide.
5. The silica fume reduces the interfacial transition zone, that is, the zone between an aggregate and its binder. Inasmuch as the interfacial transition zone is a zone of weakness, a reduction in the zone leads to increased strength.
6. The silica fume decreases carbonation thereby enabling the durability of an interior finish to be increased.
7. The silica fume enhances the bond between an aggregate and its binder.
8. The silica fume can function as a coloring agent to produce different shades ranging from white to gray to black.
9. The silica fume causes some reduction in alkali-silica reactivity.
10. The primary alkali-silica reactivity inhibitor produces a substantial additional reduction in alkali-silica reactivity so that such reactivity becomes almost non-existent.
11. The dispersing agent allows the amount of silica fume in a cementitious composition to be increased without significantly increasing the water demand. Thus, when a cementitious composition is mixed with water, the weight ratio of water to cementitious material should be no higher than 0.55, and ideally no higher than 0.5. If the weight ratio of water to cementitious material exceeds 0.55, the strength of the final product is negatively affected. Silica fume has a relatively high water demand and, in the absence of a dispersing agent, could require a weight ratio of water to cementitious material greater than 0.55. The dispersing agent makes it possible to compensate for the high water demand of the silica fume, e.g., by reducing the viscosity of a cementitious composition mixed with water.

Various modifications are possible within the meaning and range of equivalence of the appended claims.

I claim:

1. A product for making an interior finish of a basin designed to contact an aqueous medium, said product including a composition which comprises:
   at least one aggregate;
   at least one binder for said one aggregate;
   at least one pozzolan, said one pozzolan being silica fume; and
   at least one set retarder, said one set retarder comprising sodium tetraborate or lithium tetraborate.

2. The product of claim 1, wherein said composition further comprises a dispersing agent.

3. The product of claim 2, wherein said dispersing agent comprises a melamine.

4. The product of claim 2, wherein said composition comprises cementitious material and said dispersing agent constitutes about 0.2 to about 1.5 percent by weight of the cementitious material in said composition.

5. A product for making an interior finish of a basin designed to contact an aqueous medium, said product including a composition which comprises:
   at least one aggregate;
   at least one binder for said one aggregate;
   at least one pozzolan, said one pozzolan being silica fume;
   at least one set retarder; and
   a dispersing agent, said dispersing agent comprising a superplasticizer.

6. The product of claim 5, wherein said composition further comprises an alkali-silica reactivity inhibitor.

7. The product of claim 6, wherein said inhibitor comprises a lithium compound.

8. The product of claim 6, wherein the weight of said inhibitor is about 0.2 to about 1.0 times the sodium equivalent of said composition expressed in weight.

9. A product for making an interior finish of a basin designed to contact an aqueous medium, said product including a composition which comprises:
   at least one aggregate:
   at least one binder for said one aggregate;
   at least one pozzolan, said one pozzolan being silica fume;
   at least one set retarder; and
   an alkali-silica reactivity inhibitor, said inhibitor comprising a lithium compound, and said compound being lithium hydroxide or lithium nitrate.

10. A product for making an interior finish of a basin designed to contact an aqueous medium, said product including a composition which comprises:
    at least one aggregate;
    at least one binder for said one aggregate;
    at least one pozzolan, said one pozzolan being silica fume;
    at least one set retarder;
    an alkali-silica reactivity inhibitor; and
    a dispersing agent.

11. The product of claim 10, wherein said one aggregate comprises a member of the group consisting of pebbles, ceramic particles, plastic particles, glass particles and sand.

12. The product of claim 11, wherein said sand is silica sand or calcite sand.

13. The product of claim 10, wherein said one binder comprises cement.

14. The product of claim 13, wherein said one binder comprises white cement.

15. The product of claim 10, wherein said one set retarder comprises an inorganic salt.

16. The product of claim 15, wherein said one set retarder comprises a borate salt.

17. The product of claim 10, wherein said composition comprises an additional pozzolan, said additional pozzolan being metakaolin.

18. The product of claim 10, wherein said composition comprises cementitious material and the pozzolan content of said composition is about 7 to about 10 percent by weight of the cementitious material in said composition.

19. The product of claim 10, wherein said one aggregate constitutes a coloring agent, said one aggregate being ceramic particles or calcite particles.

20. The product of claim 10, further comprising a container, said composition being confined in said container.

21. A basin designed to contact an aqueous medium, said basin having an interior finish which comprises:
   at least one aggregate;
   at least one binder for said one aggregate;
   at least one pozzolan, said one pozzolan being silica fume;
   at least one set retarder; and
   a dispersing agent, said dispersing agent comprising a superplasticizer.

22. The basin of claim 21, wherein said finish further comprises an alkali-silica reactivity inhibitor.

23. The basin of claim 22, wherein said inhibitor comprises a lithium compound.

24. The swimming pool, spa or fountain of claim 22, wherein the weight of said inhibitor is about 0.2 to about 1.0 times the sodium equivalent of said finish expressed in weight.

25. The swimming pool, spa or fountain of claim 22, wherein said finish further comprises a dispersing agent.

26. The basin of claim 25, wherein said dispersing agent comprises a melamine.

27. The basin of claim 25, wherein said finish comprises cementitious material and said dispersing agent constitutes about 0.2 to about 1.5 percent by weight of the cementitious material in said finish.

28. The basin of claim 22, wherein the weight of said inhibitor is about 0.2 to about 1.0 times the sodium equivalent of said finish expressed in weight.

29. The basin of claim 28, wherein said finish further comprises a dispersing agent.

30. A basin designed to contact an aqueous medium, said basin having an interior finish which comprises:
   at least one aggregate;
   at least one binder for said one aggregate;
   at least one pozzolan, said one pozzolan being silica fume;
   at least one set retarder;
   an alkali-silica reactivity inhibitor; and
   a dispersing agent.

31. The basin of claim 30, wherein said one aggregate comprises a member of the group consisting of pebbles, ceramic particles, plastic particles, glass particles and sand.

32. The basin of claim 31, wherein said sand is silica sand or calcite sand.

33. The basin of claim 30, wherein said one binder comprises cement.

34. The basin of claim 33, wherein said one binder comprises white cement.

35. The basin of claim 30, wherein said one set retarder comprises an inorganic salt.

36. The basin of claim 35, wherein said one set retarder comprises a borate salt.

37. The basin of claim 30, wherein said interior finish comprises an additional pozzolan, said additional pozzolan being metakaolin.

38. The basin of claim 30, wherein said one aggregate constitutes a coloring agent, said one aggregate being ceramic particles or calcite particles.

39. The basin of claim 30, wherein said finish comprises cementitious material and the pozzolan content of said finish is about 7 to about 10 percent by weight of the cementitious material in said finish.

40. A method of making a basin designed to contact an aqueous medium, said method comprising the steps of:
   forming a cavity; and
   lining at least a portion of said cavity with an interior finish including at least one aggregate, at least one binder for said one aggregate, at least one pozzolan, and at least one set retarder, said one pozzolan being silica fume, and said one set retarder comprising sodium tetraborate or lithium tetraborate.

41. A method of making a basin designed to contact an aqueous medium, said method comprising the steps of:
   forming a cavity; and
   lining at least a portion of said cavity with an interior finish including at least one aggregate, at least one binder for said one aggregate, at least one pozzolan, at least one set retarder, an alkali-silica reactivity inhibitor, and a dispersing agent, said one pozzolan being silica fume.

42. The method of claim 41, wherein said one aggregate comprises a member of the group consisting of pebbles, ceramic particles, plastic particles, glass particles and sand.

43. The method of claim 41, wherein said one binder comprises cement.

44. The method of claim 41, wherein said one binder comprises white cement.

45. The method of claim 41, wherein said one set retarder comprises an inorganic salt.

46. The method of claim 45, wherein said one set retarder comprises a borate salt.

47. The method of claim 41, wherein said interior finish comprises an additional pozzolan, said additional pozzolan being metakaolin.

48. The method of claim 41, wherein said one aggregate constitutes a coloring agent, said one aggregate being ceramic particles or calcite particles.

49. The method of claim 41, wherein said finish comprises cementitious material and the pozzolan content of said finish is about 7 to about 10 percent by weight of the cementitious material in said finish.

50. A method of making a basin designed to contact an aqueous medium, said method comprising the steps of:
   forming a cavity; and
   lining at least a portion of said cavity with an interior finish including at least one aggregate, at least one binder for said one aggregate, at least one pozzolan, at least one set retarder, and a dispersing agent, said one pozzolan being silica fume, and said dispersing agent comprising a superplasticizer.

51. The method of claim 50, wherein said finish further comprises an alkali-silica reactivity inhibitor.

52. The method of claim 51, wherein said inhibitor comprises a lithium compound.

53. The method of claim 51, wherein the weight of said inhibitor is about 0.2 to about 1.0 times the sodium equivalent of said finish expressed in weight.

54. A method of making a basin designed to contact an aqueous medium, said method comprising the steps of:

forming a cavity; and lining at least a portion of said cavity with an interior finish including at least one aggregate, at least one binder for said one aggregate, at least one pozzolan, at least one set retarder, and an alkali-silica reactivity inhibitor, said one pozzolan being silica fume, and said inhibitor including a lithium compound, said compound being lithium hydroxide or lithium nitrate.

55. The method of claim 54, wherein said finish further comprises a dispersing agent.

56. The method of claim 55, wherein said dispersing agent comprises a melamine.

57. The method of claim 55, wherein said finish comprises cementitious material and said dispersing agent constitutes about 0.2 to about 1.5 percent by weight of the cementitious material in said finish.

* * * * *

UNITED STATES PATENT AND TRADEMARK OFFICE
CERTIFICATE OF CORRECTION

PATENT NO. : 6,324,802 B1
DATED : December 4, 2001
INVENTOR(S) : Gregory C. Garrett It is certified that error appears in the above-identified patent and that said Letters Patent is hereby corrected as shown below:

<u>Column 11,</u>
Line 22, change "swimming pool, spa or fountain" to -- basin --.
Lines 26-38, cancel claims 25-29.

<u>Column 14,</u>
Beginning at line 10, add the following claims:

58. A basin designed to contact an aqueous medium said basin having an interior finish which comprises:
 at least one aggregate;
 at least one binder for said one aggregate;
 at least pozzolan, said one pozzolan being silica fume; and
 at least one set retarder, said one set retarder comprising sodium tetraborate or lithium tetraborate.

59. A basin designed to contact an aqueous medium, said basin having an interior fininsh which comprises:
 at least one aggregate;
 at least one binder for said one aggregate;
 at least one pozzolan, said one pozzolan being silica fume;
 at least one set retarder; and
 an alkali-silica reactivity inhibitor, said inhibitor comprising a lithium compound, and said compound being lithium hydroxide or lithium nitrate.

60. The basin of claim 59, wherein said finish further comprises a dispersing agent.

61. The basin of claim 60, wherein said dispersing agent comprises a melamine.

UNITED STATES PATENT AND TRADEMARK OFFICE
CERTIFICATE OF CORRECTION

PATENT NO. : 6,324,802 B1
DATED : December 4, 2001
INVENTOR(S) : Gregory C. Garrett It is certified that error appears in the above-identified patent and that said Letters Patent is hereby corrected as shown below:

62. The basin of claim 60, wherein said finish comprises cementitious material and said dispersing agent constitutes about 0.2 to about 1.5 percent by weight of the cementitious material in said finish.

Signed and Sealed this

Twenty-ninth Day of October, 2002

*Attest:*

*Attesting Officer*

JAMES E. ROGAN
*Director of the United States Patent and Trademark Office*